United States Patent
Slaughter

[11] 3,865,466
[45] Feb. 11, 1975

[54] OPTICAL GUIDES

[76] Inventor: Raymond Jeffrey Slaughter, 22 Ingleby Way, Chislehurst, England

[22] Filed: Nov. 8, 1973

[21] Appl. No.: 413,890

[30] Foreign Application Priority Data
Nov. 10, 1972 Great Britain................52096/72

[52] U.S. Cl.............................................. 350/96 B
[51] Int. Cl........................................... C03c 15/00
[58] Field of Search........................ 350/96 B; 65/4

[56] References Cited
UNITED STATES PATENTS

| | | | |
|---|---|---|---|
| 3,505,046 | 4/1970 | Phaneuf............................ | 350/96 B |
| 3,554,721 | 1/1971 | Gardner............................ | 350/96 B |

Primary Examiner—Eli Lieberman
Assistant Examiner—C. E. Church
Attorney, Agent, or Firm—Eugene F. Buell

[57] ABSTRACT

An optical cable comprises an elongate central core consisting of at least one non-optical reinforcing member, a plurality of optical bundles arranged together in at least one stranded layer about the core and, surrounding the stranded body so formed, an outer protective sheath. Each optical bundle comprises a group of optical fibres or a group of fibres including at least one optical fibre and at least one non-optical reinforcing fibre or other reinforcing elongate element. The or each non-optical reinforcing member is of such a material and of such a cross-sectional area having regard to the material or materials and cross-sectional area of the bundles that the reinforcing member or members at least substantially reduces or reduce the strain that would otherwise be imparted to each bundle when the cable is stressed in such a way as to tend to subject each or any optical fibre of the bundle to a tensile force. The stranded layer or at least one of the stranded layers may include at least two elongate electrical conductors.

18 Claims, 1 Drawing Figure

PATENTED FEB 11 1975   3,865,466
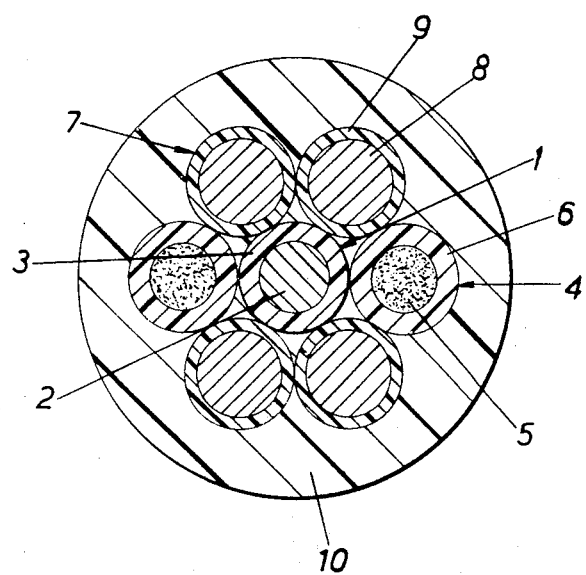

3,865,466

OPTICAL GUIDES

This invention relates to optical guides for the transmission of the ultra-violet, visible and infra-red regions of the electromagnetic spectrum, which regions, for convenience, will hereinafter all be included in the generic term "light," and especially, but not exclusively, to optical waveguides for use in the communications field adapted for transmission of light having a wavelength within the range 0.8 to 1.1 micrometres.

For the purpose of transmitting light in an optical tramsmission system it has been proposed to employ optical guides including one or more than one optical fibre. Where an optical guide comprises a plurality of optical fibres these are generally arranged in a bundle which is sometimes enclosed in an outer protective sheath.

The invention is especially, but not exclusively, concerned with optical guides including at least one bundle of optical fibres each of composite form comprising a core of transparent material clad throughout its length with another transparent material of lower refractive index which by total internal reflection of light being transmitted along the fibre confines at least a major proportion of the light within the fibre. A composite optical fibre is generally, but not necessarily, made of two glasses of different refractive indices, the glass forming the core having a higher refractive index than the glass forming the cladding. In an alternative form of composite optical fibre the core may be made of a transparent liquid having a higher refractive index than that of the cladding.

The present invention has as its principal object the provision of an optical cable which by virtue of its construction at least substantially reduces the strain that would otherwise by imparted to the or each optical bundle forming part of the cable when the cable is stressed in such a way as to tend to subject each or any optical fibre to a tensile force.

According to the invention the optical cable comprises an elongate central core consisting of at least one non-optical reinforcing member, a plurality of optical bundles as hereinafter defined arranged together in at least one stranded layer about the core and, surrounding the stranded body so formed, an outer protective sheath, the or each reinforcing member being of such a material and of such a cross-sectional area having regard to the material or materials and cross-sectional area of the bundles that the reinforcing member of members at least substantially reduces or reduce the strain that would otherwise be imparted to each bundle when the cable is stressed in such a way as to tend to subject each or any optical fibre of the bundle to a tensile force.

By the expression "optical bundle" as used in this specification is meant a group of optical fibres or a group of fibres including one or more optical fibres and one or more non-optical reinforcing fibres or other reinforcing elongate elements. Each optical fibre of an optical bundle may be used independently as a separate light guide, each with its own modulated light source and detector, or a plurality of optical fibres of a bundle may be used together as a single light guide, with a single light source.

Preferably the stranded layer or at least one of the stranded layers includes at least two elongate electric conductors, each preferably individually insulated, thereby providing at least one circuit, for instance for feeding electrical power to repeaters. Where there are at least two stranded layers of bundles and electrical conductors each layer may be of opposite hand to that of the adjacent layer or layers.

The or each non-optical reinforcing member of the central core is preferably of a material which has a Young's Modulus of at least that of glass, i.e., of at least $6.9 \times 10^4$ MN/m$^2$. The central core may comprise a plurality of solid elements stranded together, a single solid element, for instance of steel or any other suitable material having the necessary Young's Modulus, or a bundle of carbon fibres or of fibres of other suitable material, e.g. non-optical glass fibres; the fibres may be at least partially embedded in a body of encapsulating material throughout substantially the whole length of the core. The core may be enclosed in a protective sheath, for instance of rubber or plastics material.

By a "non-optical glass fibre" is meant a glass fibre that is unsuitable for use in an optical cable as an optical guide for the transmission of light.

To provide additional mechanical protection for each optical bundle, the bundle may also be enclosed in an individual protective sheath, for instance of rubber or plastics material.

The fibres of each bundle may be at least partially and preferably wholly embedded in a body of encapsulating material throughout substantially the whole length of the bundle. The encapsulating material may comprise any encapsulating material that will maintain the embedded fibres and/or groups of fibres substantially fixed with respect to one another. Preferred encapsulating materials include synthetic resins, for instance polyester resin.

The outer protective sheath of the cable is preferably an extruded sheath of plastics material and may be so extruded about the bundles and the reinforcing member or members that plastics material fills at least the outer interstices of the stranded layer or outermost stranded layer. Preferably the sheath is made of a hard polyolefin such as polypropylene or a modified polypropylene, for example propylene ethylene copolymer. Other suitable materials for the sheath include polyethylene, especially high density polyethylene, and polyvinyl chloride. The sheath may have an overshon of a material having a low friction co-efficient, such as nylon.

The invention will be further illustrated by a description, by way of example, of a preferred form of optical cable with reference to the accompanying drawing which shows a cross-sectional end view of the cable drawn to an enlarged scale.

The optical cable comprises a central core constituted by a non-optical reinforcing member 1 around which is stranded a single layer comprising two optical bundles 4 and four electrical conductors 7, and, surrounding the stranded body, an extruded outer protective sheath 10 of black polyethylene. The central reinforcing member 1 consists of a steel wire 2 of 1 mm diameter having an outer covering 3 of polyethylene to a diameter of 1.5 mm. Each bundle 4 comprises a plurality of composite optical fibres 5, the interstices between the fibres being filled with polyester resin, and has a diameter of 1 mm: the bundle is enclosed in a sheath 6 of polyethylene to a diameter of 1.5 mm. Each composite optical fibre 5 of each bundle 4 comprises a glass core having a diameter of 80 $\mu$m and a cladding of glass of lower refractive index, the fibre having an overall diameter of 120 µm. Each electrical conductor 7 comprises a copper wire 8 of 1.2 mm diameter having an insulating covering 9 of polyethylene to a diameter of 1.5 mm. The optical cable has an overall diameter of 6.0 mm.

What I claim as my invention is:

1. An optical cable comprising an elongate central core consisting of at least one non-optical reinforcing member, a plurality of optical bundles each comprising a group of fibres including at least one optical fibre, said optical bundles and a plurality of elongate electrical conductors being arranged together in at least one stranded layer about the core and, surrounding the stranded body so formed, an outer protective sheath, the or each reinforcing member being of such a material and of such a cross-sectional area having regard to the material or materials and cross-sectional area of the bundles that the reinforcing member or members at least substantially reduces or reduce the strain that would otherwise be imparted to each bundle when the cable is stressed in such a way as to tend to subject each or any optical fibre of the bundle to a tensile force.

2. An optical cable as claimed in claim 1, wherein each electrical conductor is individually insulated.

3. An optical cable comprising an elongate central core consisting of at least one non-optical reinforcing member, a plurality of optical bundles each comprising a group of fibres including at least one optical fibre, said optical bundles being arranged together in at least one stranded layer about the core and, surrounding the stranded body so formed, an outer protective sheath, the or each reinforcing member being of such a material and of such a cross-sectional area having regard to the material or materials and cross-sectional area of the bundles that the reinforcing member or members at least substantially reduces or reduce the strain that would otherwise be imparted to each bundle when the cable is stressed in such a way as to tend to subject each or any optical fibre of the bundle to a tensile force.

4. An optical cable as claimed in claim 3, in which there are at least two stranded layers, wherein each layer is of opposite hand to that of the adjacent layer or layers.

5. An optical cable as claimed in claim 3, wherein the central core is enclosed in a protective sheath.

6. An optical cable as claimed in claim 3, wherein the or each non-optical reinforcing member of the central core is of a material which has a Young's Modulus of $6.9 \times 10^4$ MN/m².

7. An optical cable as claimed in claim 3, wherein the central core comprises a group of non-optical fibres.

8. An optical cable as claimed in claim 7, wherein the group of non-optical fibres is at least partially embedded in a body of encapsulating material throughout substantially the whole length of the core.

9. An optical cable as claimed in claim 7, wherein the non-optical fibres are carbon fibres.

10. An optical cable as claimed in claim 7, wherein the non-optical fibres are non-optical glass fibres.

11. An optical cable as claimed in claim 3, wherein the central core comprises a single solid element.

12. An optical cable as claimed in claim 11, wherein the single element is of steel.

13. An optical cable as claimed in claim 3, wherein each bundle is enclosed in an individual protective sheath.

14. An optical cable as claimed in claim 3, wherein the fibres of each bundle are at least partially embedded in a body of encapsulating material throughout substantially the whole length of the bundle.

15. An optical cable as claimed in claim 14, wherein the encapsulating material is a synthetic resin.

16. An optical cable as claimed in claim 3, wherein the outer protective sheath of the cable is an extruded sheath of plastics material.

17. An optical cable as claimed in claim 16, wherein plastics material of the extruded sheath fills at least the outer interstices of the stranded layer of outermost stranded layer.

18. An optical cable as claimed in claim 3, wherein an oversheath of a material having a low friction coefficient surrounds the outer protective sheath of the cable.

* * * * *